United States Patent
Jang et al.

(10) Patent No.: US 10,131,787 B2
(45) Date of Patent: Nov. 20, 2018

(54) POLYCARBONATE RESIN COMPOSITION AND MOLDED ARTICLE COMPRISING THE SAME

(71) Applicant: Lotte Advanced Materials Co., Ltd., Yeosu-si (KR)

(72) Inventors: Mi Rae Jang, Uiwang-si (KR); Jung Ki Kim, Uiwang-si (KR); Eun Taek Woo, Uiwang-si (KR); Na Ri Park, Uiwang-si (KR); Yoo Jin Jung, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/970,934

(22) Filed: Dec. 16, 2015

(65) Prior Publication Data

US 2016/0168377 A1 Jun. 16, 2016

(30) Foreign Application Priority Data

Dec. 16, 2014 (KR) .......................... 10-2014-0181300

(51) Int. Cl.
| | |
|---|---|
| *C08L 69/00* | (2006.01) |
| *C08L 55/02* | (2006.01) |
| *C08K 3/22* | (2006.01) |
| *C08J 5/00* | (2006.01) |

(52) U.S. Cl.
CPC ................. *C08L 69/00* (2013.01); *C08J 5/00* (2013.01); *C08L 2205/03* (2013.01); *C08L 2207/53* (2013.01)

(58) Field of Classification Search
CPC ........................................................ C08L 69/00
See application file for complete search history.

(56) References Cited

U.S. PATENT DOCUMENTS

| | | | |
|---|---|---|---|
| 6,204,313 B1 * | 3/2001 | Bastiaens | C08K 5/49 524/100 |
| 8,916,637 B2 | 12/2014 | Van Hartingsveldt et al. | |
| 2014/0076616 A1 * | 3/2014 | Meng | H05K 1/0353 174/255 |

FOREIGN PATENT DOCUMENTS

| | | |
|---|---|---|
| CN | 101784607 A | 7/2010 |
| KR | 10-2010-0055474 A | 5/2010 |
| KR | 10-2010-0066193 A | 6/2010 |

OTHER PUBLICATIONS

Office Action in counterpart Chinese Application No. 201510925455.9 dated Mar. 28, 2017, pp. 1-6.

Office Action in counterpart Korean Application No. 10-2014-0181300 dated Feb. 7, 2017, pp. 1-5.

\* cited by examiner

*Primary Examiner* — Brieann R Johnston

(74) *Attorney, Agent, or Firm* — Additon, Higgins & Pendleton, P.A.

(57) ABSTRACT

A polycarbonate resin composition and a molded article using the same is disclosed. The polycarbonate resin composition includes a polycarbonate resin (A); a rubber-modified aromatic vinyl copolymer (B); and an additive for laser directed structuring (C). The polycarbonate resin composition has a heat deflection temperature (HDT) of about 100° C. or more.

9 Claims, No Drawings

POLYCARBONATE RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application No. 10-2014-0181300, filed on Dec. 16, 2014 in the Korean Intellectual Property Office, the entire disclosure of which is incorporated herein by reference.

FIELD

The present invention relates to a polycarbonate resin composition and a molded article comprising the same.

BACKGROUND

Thermoplastic resins have a lower specific gravity than glass or metals, and have excellent mechanical characteristics such as moldability and impact resistance. Plastic products made using such thermoplastic resins are quickly replacing glass or metal in products such as electric and electronic products and automobile parts.

Recently, there has been a focus on technology such as directed plating and laser molding for forming a desired fine pattern at a desired position by introducing a material capable of providing processability to a thermoplastic resin as an additive.

For example, smartphone antennas need a separate electrode according to each frequency bandwidth. However, it is difficult to implement a fine pattern according to a frequency band. Therefore, thermoplastic resins having excellent processability are necessary.

Thermoplastic resins having such an additive have an advantage in that a fine pattern may be easily implemented at a desired position. However, there is a problem in that mechanical characteristics, exterior characteristics and the like may decrease due to the introduction of such an additive.

Therefore, in order to address such problems, there is a need for a thermoplastic resin composition having excellent heat resistance, impact resistance, and fluidity in which laser directed molding is possible and a fine pattern may be implemented when laser directed molding is performed.

SUMMARY OF THE INVENTION

Embodiments provide a polycarbonate resin composition. In exemplary embodiments, the polycarbonate resin composition includes a polycarbonate resin (A); a rubber-modified aromatic vinyl copolymer (B); and an additive for laser directed structuring (C). The polycarbonate resin composition may have a heat deflection temperature (HDT) of about 100° C. or more.

In exemplary embodiments, the polycarbonate resin composition may further include an aromatic vinyl copolymer (D).

In exemplary embodiments, the rubber-modified aromatic vinyl copolymer (B) may be present in an amount of about 5 parts by weight to about 50 parts by weight, based on about 100 parts by weight of the polycarbonate resin (A).

In exemplary embodiments, the additive for laser directed structuring (C) may be present in an amount of about 2 parts by weight to about 30 parts by weight, based on about 100 parts by weight of the polycarbonate resin (A).

In exemplary embodiments, the rubber-modified aromatic vinyl copolymer (B) may include a rubber polymer having an average diameter of about 200 nm to about 400 nm. The rubber polymer may be present in an amount of about 10 parts by weight to about 70 parts by weight based on about 100 parts by weight of the rubber-modified aromatic vinyl copolymer (B).

In exemplary embodiments, the additive for laser directed structuring (C) may include a metal oxide.

In exemplary embodiments, the metal oxide may include at least one of a copper (Cu)-containing metal oxide, a zinc (Zn)-containing metal oxide, a chromium (Cr)-containing metal oxide, a tin (Sn)-containing metal oxide, a magnesium (Mg)-containing metal oxide, an aluminium (Al)-containing metal oxide, a gold (Au)-containing metal oxide, a silver (Ag)-containing metal oxide, a cadmium (Cd)-containing metal oxide, a manganese (Mn)-containing containing metal oxide, a nickel (Ni)-containing metal oxide, a cobalt (Co)-containing metal oxide, a titanium (Ti)-containing metal oxide, and/or an iron (Fe)-containing metal oxide.

In exemplary embodiments, the metal oxide may have a spinel structure.

In exemplary embodiments, the aromatic vinyl copolymer (D) may be present in an amount of about 0.1 parts by weight to about 100 parts by weight, based on about 100 parts by weight of the polycarbonate resin (A).

In exemplary embodiments, the polycarbonate resin (A) and the aromatic vinyl copolymer (D) may be included at a weight ratio of about 1:1 to about 40:1.

In exemplary embodiments, the aromatic vinyl copolymer (D) may be obtained by copolymerizing an aromatic vinyl monomer and a monomer copolymerizable with the aromatic vinyl monomer. In exemplary embodiments, the aromatic vinyl monomer may include at least one of styrene, α-methyl styrene, a halogen-substituted styrene and/or a $C_1$ to $C_{10}$ alkyl-substituted styrene. In exemplary embodiments, the monomer copolymerizable with the vinyl monomer may include at least one of acrylonitrile, methacrylonitrile, ethacrylonitrile, phenyl acrylonitrile, α-chloro acrylonitrile, and/or fumaronitrile.

Other embodiments provide a molded article including the polycarbonate resin composition.

In exemplary embodiments, the molded article may have Izod impact strength (⅛" notched) measured in accordance with ASTM D256 of about 15 kgf·cm/cm to about 60 kgf·cm/cm and a melt index (250° C., 10 kg) measured in accordance with ASTM D1238 of about 20 g/10 min to about 70 g/10 min.

In exemplary embodiments, a plating pattern may be entirely or partially formed on a surface of the molded article (i.e., a portion of or the entire surface of the molded article may include the plating pattern).

The polycarbonate resin composition includes an additive for laser directed structuring and can have improved plating characteristics and processability. A molded article formed of the polycarbonate resin composition can have a fine pattern easily molded on a surface thereof.

The polycarbonate resin composition also includes a rubber-modified aromatic vinyl copolymer and optionally an aromatic vinyl copolymer and can have excellent impact resistance and fluidity and an excellent exterior may be ensured.

The polycarbonate resin composition and a molded article comprising the same can also have excellent heat resistance, and deformation of an injected molded article during a plating process may be minimized or prevented.

DETAILED DESCRIPTION

Hereinafter, embodiments of the present invention will be described in detail in the following detailed description, in which some, but not all, embodiments are described. Indeed, this invention may be embodied in many different forms and should not be construed as limited to the embodiments set forth herein; rather, these embodiments are provided so that this disclosure will satisfy applicable legal requirements. It should be understood that the following embodiments are provided for complete disclosure and thorough understanding of the invention by those skilled in the art. Descriptions of known functions and constructions which can unnecessarily obscure the subject matter of the invention will be omitted.

Unless otherwise defined, all terms (including technical and scientific terms) used herein have a meaning generally understood by those skilled in the art and as is customary in the art to which this invention belongs. Also, it will be further understood that terms, such as those defined in commonly used dictionaries, will not be interpreted in an idealized or overly formal sense unless expressly so defined herein.

Polycarbonate Resin Composition

In exemplary embodiments, the polycarbonate resin composition includes a polycarbonate resin (A); a rubber-modified aromatic vinyl copolymer (B); and an additive for laser directed structuring (C), which are components that can implement excellent physical characteristics and processability. These components will be described below in detail.

(A) Polycarbonate Resin

A general polycarbonate resin may be used as the polycarbonate resin (A). For example, an aromatic polycarbonate resin prepared by reacting a diphenolic compound represented by the following Formula 1 with phosgene, a halogen formate or a carbonic acid diester may be used.

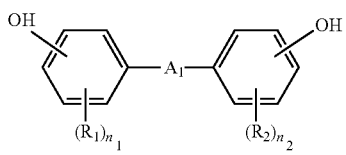

[Formula 1]

In Formula 1, $A_1$ is a single bond, a substituted or unsubstituted straight or branched $C_1$ to $C_{30}$ alkylene group, a substituted or unsubstituted $C_2$ to $C_5$ alkylidene group, a substituted or unsubstituted $C_3$ to $C_6$ cycloalkylene group, a substituted or unsubstituted $C_5$ to $C_6$ cycloalkylidene group, CO, S, or SO2; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer of 0 to 4.

As used herein, unless otherwise defined, the term "substituted" means that a hydrogen atom is substituted with at least one substituent such as a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, and the like, and mixtures thereof. Also as used herein, unless otherwise defined, the term "hetero" refers to one or more of an oxygen atom (O), a nitrogen atom (N), a sulfur atom (S), a phosphorous atom (P), and the like and mixtures thereof.

Examples of the diphenol may include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof.

In exemplary embodiments, 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane may be used. As another example, 2,2-bis-(4-hydroxyphenyl)-propane also called bisphenol-A may be used.

In exemplary embodiments, the polycarbonate resin may have a weight average molecular weight (Mw) of about 10,000 g/mol to about 200,000 g/mol, for example, about 15,000 g/mol to about 80,000 g/mol.

A polycarbonate resin having a branched chain may be used. For example, a branched polycarbonate resin may be prepared by adding a compound having a trivalent or higher multifunctional group, for example a trivalent or higher phenol group, in an amount of about 0.05 mol % to about 2 mol %, based on the total amount of the diphenol.

Also, the polycarbonate resin may be a homopolycarbonate resin and/or a copolycarbonate resin, or a blend of the copolycarbonate resin and/or the homopolycarbonate resin.

Also, the polycarbonate resin may be partially or entirely replaced with an aromatic polyester-carbonate resin that is obtained by a polymerization reaction in the presence of an ester precursor, for example, a bifunctional carboxylic acid.

(B) Rubber-Modified Aromatic Vinyl Copolymer

The rubber-modified aromatic vinyl copolymer (B) may be a resin polymer in which a grafted rubber polymer is dispersed in the form of particles in a matrix (a continuous phase) of an aromatic vinyl copolymer (that does not include a rubber polymer). As the rubber-modified aromatic vinyl copolymer (B), any material that includes a rubber component to exhibit an impact modifying effect, and may be mixed with the polycarbonate resin (A) and an aromatic vinyl copolymer (D) to be described below may be used without limitation.

The rubber-modified aromatic vinyl copolymer (B) may be obtained by adding an aromatic vinyl monomer and a monomer copolymerizable with the aromatic vinyl monomer, and optionally a monomer for providing processability and heat resistance, to a rubber polymer, and these are then polymerized (graft copolymerized). The polymerization may be performed by, for example, emulsion polymerization, solution polymerization, suspension polymerization, mass polymerization, and the like.

Examples of the rubber-modified aromatic vinyl copolymer (B) include without limitation acrylonitrile-butadiene-styrene (ABS) copolymer resins, acrylonitrile-styrene-acrylate (ASA) copolymer resins (ASA), acrylonitrile-ethylene propylene rubber-styrene (AES) copolymer resins, methylmethacrylate-butadiene-styrene (MBS) copolymer resins, and the like, and mixtures thereof.

As the rubber-modified aromatic vinyl copolymer (B), a graft copolymer alone or a graft copolymer and an aromatic vinyl copolymer (that does not include a rubber polymer) may be used in combination and can be blended taking into consideration compatibility.

Examples of the rubber polymer may include without limitation diene rubbers, saturated rubbers obtained by adding hydrogen to the diene rubber, acrylate rubbers, isoprene rubbers, ethylene-propylene-diene monomer terpolymers, silicone rubbers, and the like, and mixtures thereof.

Examples of the diene rubber include without limitation polybutadiene, poly(styrene-butadiene), poly(acrylonitrile-butadiene) and the like. These may be used alone or in mixtures of two or more thereof, but the present invention is not limited thereto.

Examples of the acrylate rubber may include without limitation, polymethyl acrylate, polyethyl acrylate, poly n-propyl acrylate, poly n-butyl acrylate, poly 2-ethylhexyl acrylate, polyhexyl methacrylate, poly 2-ethylhexyl methacrylate and the like. These may be used alone or in mixtures of two or more thereof, but the present invention is not limited thereto.

Examples of the silicone rubber may include without limitation polyhexamethyl cyclotrisiloxane, polyoctamethyl cyclotri siloxane, polydecamethyl cyclotri siloxane, polydodecamethyl cyclotri siloxane, polytrimethyltriphenyl cyclosiloxane, polytetramethyltetraphenyl cyclotetrasiloxane, polyoctaphenyl cyclotetrasiloxane and the like. These may be used alone or in mixtures of two or more thereof, but the present invention is not limited thereto.

As the rubber polymer, for example, the diene rubber may be used. As another example, a butadiene rubber may be used.

The rubber-modified aromatic vinyl copolymer (B) may include the rubber polymer in an amount of about 10 parts by weight to about 70 parts by weight, for example about 45 parts by weight to about 65 parts by weight, and as another example about 50 parts by weight to about 60 parts by weight, based on about 100 parts by weight of the rubber-modified aromatic vinyl copolymer (B). Within this range, it is possible to effectively supplement impact strength and minimize a decrease of other physical characteristics.

The rubber polymer may have an average particle diameter of about 200 nm to about 400 nm, for example about 250 nm to about 350 nm, and as another example about 250 nm to about 300 nm. When a particle size is decreased and/or a content (amount) of the rubber polymer is increased, impact strength may be enhanced.

Methods generally used for measuring the average diameter of a particle such as a mode diameter representing a maximum value of a distribution, a median diameter corresponding to a median value of an integral distribution curve, various average diameters (a number average, a length average, an area average, a mass average, a volume average and the like), and the like may be used. Unless otherwise described herein, however, in the present invention, the term "average diameter" refers to a "number-average diameter," that is obtained by measuring D50 (a diameter at a point whose distribution ratio is 50%).

Examples of the aromatic vinyl monomer that may be graft-copolymerized with the rubber polymer include without limitation styrene, α-methyl styrene, halogen-substituted styrene, $C_1$ to $C_{10}$ alkyl-substituted styrene and the like, and mixtures thereof. For example, styrene may be used.

Examples of the monomer copolymerizable with the aromatic vinyl monomer may include without limitation acrylonitrile, methacrylonitrile, and the like, and mixtures thereof. For example, acrylonitrile may be used.

Examples of the monomer for providing processability and heat resistance may include without limitation acrylic acid, methacrylic acid, acrylic acid alkyl ester, methacrylic acid alkyl ester, N-substituted maleimide, maleic anhydride, and the like, and mixtures thereof. As used herein, alkyl refers to a $C_1$ to $C_8$ alkyl.

The polycarbonate resin composition may include the rubber-modified aromatic vinyl copolymer (B) in an amount of about 5 parts by weight to about 50 parts by weight, for example about 7 parts by weight to about 44 parts by weight, and as another example about 16 parts by weight to about 31 parts by weight, based on about 100 parts by weight of the polycarbonate resin (A). In some embodiments, the polycarbonate resin composition may include the rubber-modified aromatic vinyl copolymer (B) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 parts by weight. Further, according to some embodiments of the present invention, the rubber-modified aromatic vinyl copolymer (B) may be present in an amount of from about any of the foregoing amounts to about any other of the foregoing amounts.

Within this range, it is possible to effectively supplement impact strength of the polycarbonate resin composition and minimize a decrease of other physical characteristics.

(C) Additive for Laser Directed Structuring

A laser directed structuring (LDS) technique is a technique through which a metal nucleus may be formed by laser and a plating pattern can be formed in a molded product. In the present invention, an additive for laser directed structuring used for a general resin composition may be used for laser directed structuring.

In exemplary embodiments, when a resin including the additive for laser directed structuring is used for molding and laser is emitted (directed) to a surface of the molded product, a chemical change is caused at a part to which the laser is emitted. The chemical change is caused when an organometallic compound in the resin is reacted with the laser and decomposed into metal ions such as Ni, Cu, and Fe and an organic material. Such metal ions serve as a seed of plating, and a plating pattern is formed on the molded product through an electroless plating process.

As used herein, the laser refers to light (stimulated emission light) amplified by stimulated emission of radiation. The laser may be ultraviolet light having a wavelength of about 100 nm to about 400 nm, visible light having a wavelength of about 400 nm to about 800 nm, or infrared light having a wavelength of about 800 nm to about 25,000 nm. For example, infrared light having a wavelength of about 1,000 nm to about 2,000 nm may be used.

Any material capable of providing plating characteristics and processability to the polycarbonate resin composition may be used as the additive for laser directed structuring (C).

In exemplary embodiments, the additive for laser directed structuring (C) may include a metal oxide. Examples of the metal oxide can include without limitation a copper (Cu)-containing metal oxide, a zinc (Zn)-containing metal oxide, a chromium (Cr)-containing metal oxide, a tin (Sn)-containing metal oxide, a magnesium (Mg)-containing metal oxide, an aluminium (Al)-containing metal oxide, a gold (Au)-containing metal oxide, a silver (Ag)-containing metal oxide, a cadmium (Cd)-containing metal oxide, a manganese (Mn)-containing metal oxide, a nickel (Ni)-containing metal oxide, a cobalt (Co)-containing metal oxide, a titanium (Ti)-containing metal oxide, an iron (Fe)-containing metal oxide, and the like. These may be used alone or in mixtures of two or more thereof. For example, the copper-containing metal oxide may be used. The copper-containing metal oxide may be appropriate to form a fine pattern by providing excellent plating characteristics and processability to the polycarbonate resin (A).

The metal oxide may have a spinel structure. The spinel structure is a crystal structure of a compound represented by $AB_2X_4$, and refers to a structure in which X is in a cubic close-packed arrangement, B is inserted into an octahedral gap and A is inserted into a tetrahedral gap. The spinel structure has an advantage in that processability may be maximized.

A may be copper (Cu), zinc (Zn), tin (Sn), magnesium (Mg), aluminium (Al), gold (Au) and/or silver (Ag), but the present invention is not limited thereto.

B may be cadmium (Cd), manganese (Mn), nickel (Ni), zinc (Zn), copper (Cu), cobalt (Co), magnesium (Mg), tin (Sn), titanium (Ti), iron (Fe), aluminium (Al) and/or chromium (Cr), but the present invention is not limited thereto.

In A or B, any divalent metal cation may be used as "A," and any trivalent metal cation may be used as "B."

X may be oxygen, but the present invention is not limited thereto.

When the polycarbonate resin composition including the additive for laser directed structuring (C) is used, there are advantages in that it is possible to form a desired circuit pattern in the polycarbonate resin through direct laser treatment, and decrease the number of processes since there is no need to use chemical agents used in electroplating.

The polycarbonate resin composition may include the additive for laser directed structuring (C) in an amount of about 2 parts by weight to about 30 parts by weight, for example about 4 parts by weight to about 20 parts by weight, and as another example about 10 parts by weight to about 14 parts by weight, based on about 100 parts by weight of the polycarbonate resin (A). In some embodiments, the polycarbonate resin composition may include the additive for laser directed structuring (C) in an amount of about 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the additive for laser directed structuring (C) may be present in an amount of from about any of the foregoing amounts to about any other of the foregoing amounts.

Within the range, it is possible to easily implement a fine pattern with minimal or no decrease in physical characteristics of the polycarbonate resin composition.

(D) Aromatic Vinyl Copolymer

In exemplary embodiments, the polycarbonate resin composition may further optionally include an aromatic vinyl copolymer (D).

The aromatic vinyl copolymer (D) may include a copolymer formed of a mixture of an aromatic vinyl monomer and a monomer copolymerizable with the aromatic vinyl monomer, and may be prepared by copolymerizing, for example, the aromatic vinyl monomer with a cyanide vinyl monomer.

In exemplary embodiments, the aromatic vinyl copolymer (D) may optionally further include a monomer for providing processability and heat resistance.

Examples of the aromatic vinyl monomer may include without limitation styrene, α-methyl styrene, a halogen-substituted styrene, a $C_1$ to $C_{10}$ alkyl-substituted styrene and the like. These may be used alone or in mixtures of two or more thereof.

In exemplary embodiments, a cyanide vinyl monomer may be used as the monomer copolymerizable with the aromatic vinyl monomer. Examples of the cyanide vinyl monomer may include without limitation acrylonitrile, methacrylonitrile, ethacrylonitrile, phenyl acrylonitrile, α-chloro acrylonitrile, fumaronitrile and the like. These may be used alone or in mixtures of two or more thereof. For example, the acrylonitrile may be used.

Examples of the optional monomer for providing processability and heat resistance may include without limitation acrylic acid, methacrylic acid, acrylic acid alkyl ester, methacrylic acid alkyl ester, maleic anhydride, N-substituted maleimide and the like and mixtures thereof.

In exemplary embodiments, at least one of a methacrylic acid alkyl ester and/or an acrylic acid alkyl ester may be used. In this case, the alkyl refers to a $C_1$ to $C_8$ alkyl.

The mixture of the aromatic vinyl monomer and the cyanide vinyl monomer may include about 60 wt % to about 80 wt % of the aromatic vinyl monomer, based on the total weight (100 wt %) of the copolymer formed of the mixture of the aromatic vinyl monomer and the cyanide vinyl monomer. For example, the aromatic vinyl monomer may be included in an amount of about 70 wt % to about 80 wt %. As another example, the aromatic vinyl monomer may be included in an amount of about 72 wt % to about 80 wt %.

The copolymer formed of the mixture of the aromatic vinyl monomer and the cyanide vinyl monomer may have a weight average molecular weight of about 70,000 g/mol to about 400,000 g/mol, for example, a weight average molecular weight of about 80,000 g/mol to about 200,000 g/mol.

In exemplary embodiments, the copolymer formed of the mixture of the aromatic vinyl monomer and the cyanide vinyl monomer may be a styrene-acrylonitrile copolymer (SAN) resin.

The styrene-acrylonitrile copolymer (SAN) resin may be formed by copolymerizing a styrene monomer in an amount of about 60 wt % to about 80 wt %, for example about 70 wt % to about 80 wt %, with an acrylonitrile monomer in an amount of about 20 wt % to about 40 wt %, for example about 20 wt % to about 30 wt %.

When the monomers of the styrene-acrylonitrile copolymer resin are included in an amount within the above range, impact resistance of the polycarbonate resin composition may increase and an exterior of an injected molded article may significantly increase.

In exemplary embodiments, the polycarbonate resin composition may include the aromatic vinyl copolymer (D) in an amount of about 0.1 parts by weight to about 100 parts by weight, for example about 2.5 parts by weight to 77 parts by weight, and as another example about 10 parts by weight to about 32 parts by weight, based on about 100 parts by weight of the polycarbonate resin (A). In some embodiments, the polycarbonate resin composition can include the aromatic vinyl copolymer (D) in an amount about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 parts by weight. Further, according to some embodiments of the present invention, the aromatic vinyl copolymer (D) may be present in an amount of from about any of the foregoing amounts to about any other of the foregoing amounts.

Within the above range, compatibility between the polycarbonate resin (A) and the rubber-modified aromatic vinyl copolymer (B) can be excellent, and exterior characteristics and mechanical characteristic may be excellent.

In exemplary embodiments, the polycarbonate resin (A) and the aromatic vinyl copolymer (D) may be included at a weight ratio of about 1:1 to about 40:1. For example, the polycarbonate resin (A) and the aromatic vinyl copolymer (D) may be included at a weight ratio of about 1:1 to about 10:1. As another example, the polycarbonate resin (A) and the aromatic vinyl copolymer (D) may be included at a weight ratio of about 1:1 to about 5:1. Within this weight ratio, it is possible to implement excellent exterior and physical characteristics while maintaining excellent processability.

In exemplary embodiments, the polycarbonate resin composition may have a heat deflection temperature (HDT) of about 100° C. or more. For example, the heat deflection temperature may be about 100° C. to about 200° C. As another example, the heat deflection temperature may be about 100° C. to about 140° C. In the present invention, the heat deflection temperature (HDT) may be measured by applying a load of 18.56 kgf/cm$^2$ to a polycarbonate resin composition sample having a thickness of 6.4 mm according to ASTM D648.

When the polycarbonate resin composition includes the types and amounts of components discussed herein, it is possible to implement a heat deflection temperature (HDT) of about 100° C. or more while maintaining excellent physical characteristics such as impact resistance, plating characteristics and processability.

Molded Article Including Polycarbonate Resin Composition

Other embodiments provide a molded article including the polycarbonate resin composition. In exemplary embodiments, the molded article including the polycarbonate resin composition may be applied to various industrial fields such as various electric and electronic products and automobile parts.

In exemplary embodiments, a plating pattern may be entirely or partially formed on a surface of the molded article.

In exemplary embodiments, the molded article may have an Izod impact strength (⅛" notched) of about 15 kgf·cm/cm to about 60 kgf·cm/cm, which is measured in accordance with ASTM D256. For example, the molded article may have an Izod impact strength (⅛" notched) measured according to ASTM D256 of about 18 kgf·cm/cm to about 59 kgf·cm/cm, for example, about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 kgf·cm/cm. Within this range, the molded article can have excellent laser processability and it is possible to simultaneously implement excellent mechanical characteristics and flow characteristics.

In exemplary embodiments, the molded article may have a melt index (250° C., 10 kg) measured in accordance with ASTM D1238 of about 20 g/10 min to about 70 g/10 min. For example, the molded article can have a melt index (250° C., 10 kg) measured according to ASTM D1238 of about 24 g/10 min to about 42 g/10 min, for example, about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or 70 g/10 min. Within this range, the molded article can have excellent laser processability, and it is possible to simultaneously implement excellent mechanical characteristics and flow characteristics.

Next, the present invention will be described in more detail with reference to the following examples. It should be understood that these examples are provided for illustration only and are not to be construed in any way as limiting the scope of the present invention in any respect.

EXAMPLES AND COMPARATIVE EXAMPLES

Specifications of a polycarbonate resin (A), a rubber-modified aromatic vinyl copolymer (B), an additive for laser directed structuring (C) and an aromatic vinyl copolymer (D) used in examples and comparative examples of the present invention are as follows.

(A) Polycarbonate resin: an L-1225WX product, which is a medium viscosity polycarbonate resin (commercially available from TEIJIN CHEMICALS), is used.

(B) Rubber-modified aromatic vinyl copolymer: an acrylonitrile-butadiene-styrene copolymer (ABS) resin (commercially available from Samsung SDI) of a core-shell type and a rubber diameter of 270 nm is used. The resin is prepared by graft-polymerizing 58 parts by weight of a butadiene rubber and 42 parts by weight of a monomer mixture including 25 wt % acrylonitrile monomer and 75 wt % styrene monomer.

(C) Additive for laser directed structuring: a Black 1 G product, which is a copper chromium oxide (commercially available from SHEPHERD), is used as a copper metal oxide.

(D) Aromatic vinyl copolymer: a styrene-acrylonitrile copolymer (SAN) resin product (commercially available from Samsung SDI) including 24 wt % acrylonitrile and 76 wt % styrene, and having a weight average molecular weight of 150,000 g/mol is used.

Components are added according to the amounts set forth in the following Table 1, dried and mixed, and then processed at a nozzle temperature of about 230° C. to prepare pellets using a twin screw extruder having a diameter of φ=45 mm. The prepared pellets are dried at 80° C. for 4 hours or more and then an evaluation sample is prepared at a temperature of about 260° C.

TABLE 1

| Classification | Examples | | | | | | | | Comparative Examples | | | |
|---|---|---|---|---|---|---|---|---|---|---|---|---|
| (unit: parts by weight) | 1 | 2 | 3 | 4 | 5 | 6 | 7 | 8 | 1 | 2 | 3 | 4 |
| (A) Polycarbonate resin | 100 | 100 | 100 | 100 | 100 | 100 | 100 | 100 | 100 | 100 | 100 | 100 |
| (B) Rubber-modified aromatic vinyl copolymer | 16 | 9 | 31 | 18 | 18 | 18 | 21 | 26 | 34 | 48 | 80 | 600 |
| (C) Additive for laser directed structuring | 10 | 12 | 12 | 4 | 20 | 12 | 14 | 17 | 22 | 32 | 53 | 400 |
| (D) Aromatic vinyl copolymer | 2.5 | 32 | 10 | 31 | 15 | 23 | 45 | 77 | 128 | 220 | 434 | 3900 |

Heat deflection temperature, hot water resistance, impact strength and melt index of the samples obtained according to the contents and composition according to Table 1 are evaluated by the following methods. The results are shown in the following Table 2.

Physical Characteristic Evaluation Method (1) Heat resistance (HDT): Heat deflection temperature (HDT) is measured by applying a load of 18.56 kgf/cm$^2$ to a sample having a thickness of 6.4 mm in accordance with ASTM D648.

(2) Hot water resistance test: Hot water resistance is evaluated as "not good" only if a coated film is detached when the sample is immersed in a constant-temperature water tank (98±2° C.) for 30 minutes and then an external stimulus is applied to a surface.

(3) Izod impact strength (kgf·cm/cm): Izod impact strength is measured in accordance with ASTM D256 with a ⅛" notched sample.

(4) Melt index: Melt index is measured in accordance with ASTM D1238 at conditions of 250° C./10 kg.

TABLE 2

| Classification | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Heat resistance (° C.) | 136 | 126 | 126 | 125 | 121 | 127 | 115 | 106 | 98 | 97 | 96 | 93 |
| Hot water resistance test | good | good | good | good | good | good | good | good | not good | not good | not good | not good |
| Izod impact strength (kgf · cm/cm) | 57 | 51 | 59 | 24 | 18 | 55 | 48 | 36 | 19 | 11 | 7 | 3 |
| Melt index (g/10 min) | 24 | 35 | 28 | 51 | 57 | 32 | 35 | 42 | 46 | 52 | 58 | 66 |

As shown in Table 2, the polycarbonate resin compositions of Examples 1 to 8 according to the compositions of the present invention have similar excellent heat resistance, impact strength and melt indices.

On the other hand, in Comparative Examples 1 to 4 which include the rubber-modified aromatic vinyl copolymer (B), the additive for laser directed structuring (C) and/or the aromatic vinyl copolymer (D) in an amount outside of the range of the present invention, heat resistance significantly decreases to less than 100° C., impact strength significantly decreases, and the compositions fail to pass the hot water resistance test compared to Examples 1 to 8.

Accordingly, Examples 1 to 8 balance excellent impact strength and fluidity, but Comparative Examples 1 to 4 have significantly lower impact strength with respect to fluidity, and are difficult to apply to actual products.

Therefore, the data demonstrates that compositions including the combination of components and amounts thereof described herein can exhibit excellent heat resistance, impact strength and fluidity.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A polycarbonate resin composition comprising:
100 parts by weight of a polycarbonate resin (A);
about 9 parts by weight to about 31 parts by weight of a rubber-modified aromatic vinyl copolymer (B);
about 10 parts by weight to about 12 parts by weight of an additive for laser directed structuring (C); and
about 2.5 parts to about 32 parts by weight of an aromatic vinyl copolymer (D),
wherein the composition has a heat deflection temperature (HDT) of 126° C. to 136° C.,
wherein a molded article comprising the polycarbonate resin composition has an impact strength (⅛" notched) measured in accordance with ASTM D256 of about 51 kgf·cm/cm to about 59 kgf·cm/cm and a melt index (250° C., 10 kg) measured in accordance with ASTM D1238 of about 24 g/10 min to about 32 g/10 min.

2. The polycarbonate resin composition according to claim 1, wherein the rubber-modified aromatic vinyl copolymer (B) includes a rubber polymer having an average diameter of about 200 nm to about 400 nm, and
wherein the rubber polymer is present in an amount of about 10 parts by weight to about 70 parts by weight, based on about 100 parts by weight of the rubber-modified aromatic vinyl copolymer (B).

3. The polycarbonate resin composition according to claim 1, wherein the additive for laser directed molding (C) includes a metal oxide.

4. The polycarbonate resin composition according to claim 1, wherein the additive for laser directed structuring (C) includes one or more of a copper (Cu)-containing metal oxide, a zinc (Zn)-containing metal oxide, a chromium (Cr)-containing metal oxide, a tin (Sn)-containing metal oxide, a magnesium (Mg)-containing metal oxide, an aluminium (Al)-containing metal oxide, a gold (Au)-containing metal oxide, a silver (Ag)-containing metal oxide, a cadmium (Cd)-containing metal oxide, a manganese (Mn)-containing metal oxide, a nickel (Ni)-containing metal oxide, a cobalt (Co)-containing metal oxide, a titanium (Ti)-containing metal oxide, and an iron (Fe)-containing metal oxide.

5. The polycarbonate resin composition according to claim 3, wherein the metal oxide has a spinel structure.

6. The polycarbonate resin composition according to claim 1, comprising the polycarbonate resin (A) and the aromatic vinyl copolymer (D) at a weight ratio of 3.1:1 to about 40:1.

7. The polycarbonate resin composition according to claim 1, wherein the aromatic vinyl copolymer (D) is a copolymer of an aromatic vinyl monomer and a monomer copolymerizable with the aromatic vinyl monomer,
wherein the aromatic vinyl monomer includes one or more of styrene, α-methyl styrene, a halogen-substituted styrene and an alkyl-substituted styrene, and
wherein the monomer copolymerizable with the vinyl monomer includes one or more of acrylonitrile, ethacrylonitrile, α-chloro acrylonitrile, and fumaronitrile.

8. A molded article comprising the polycarbonate resin composition according to claim 1.

9. The molded article according to claim 8, wherein the molded article has a surface in which a plating pattern is entirely or partially formed.

* * * * *